July 8, 1969   J. H. MERCIER   3,454,191
CLOSURE MEANS FOR COVER MEMBER OF PRESSURE VESSEL
Filed Jan. 26, 1967   Sheet 1 of 6
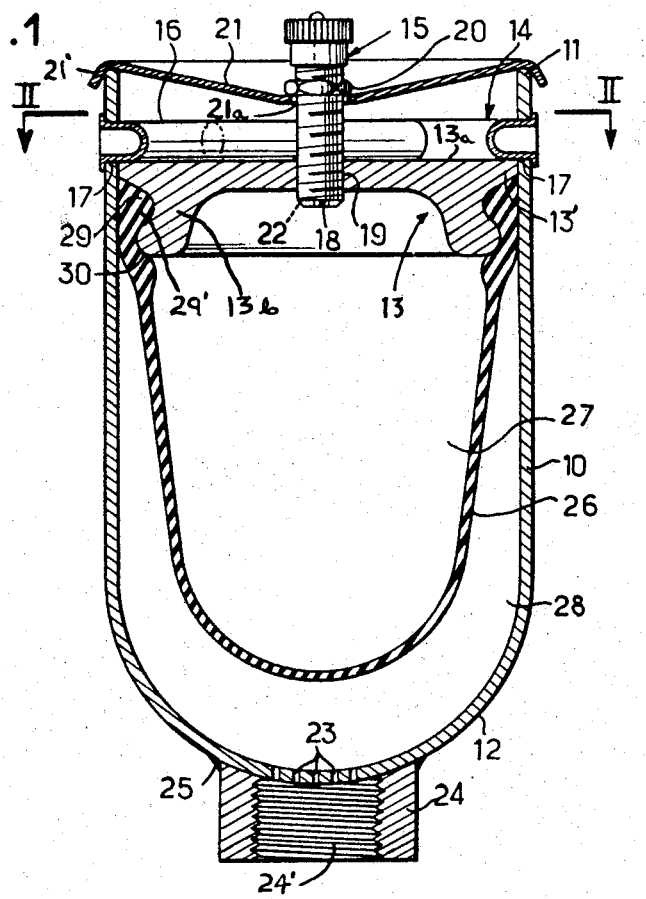
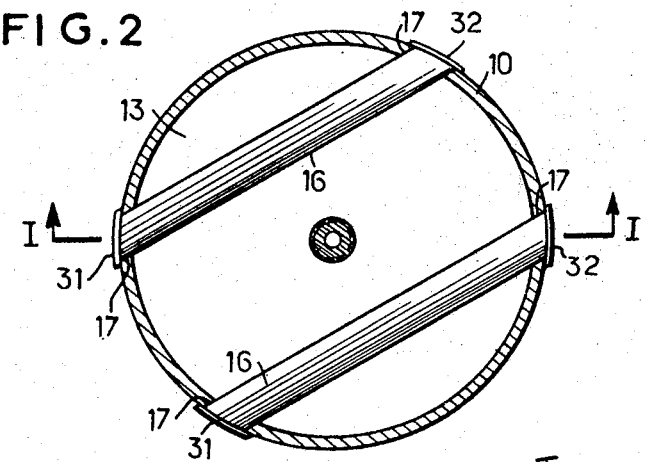
INVENTOR
JACQUES H. MERCIER
BY Arthur B. Colvin
ATTORNEY INVENTOR
Jacques H. Mercier
BY Arthur B Colvin
ATTORNEY July 8, 1969     J. H. MERCIER     3,454,191

CLOSURE MEANS FOR COVER MEMBER OF PRESSURE VESSEL

Filed Jan. 26, 1967             Sheet 3 of 6

Jacques H. Mercier INVENTOR

BY Arthur B. Colvin ATTORNEY

United States Patent Office 3,454,191
Patented July 8, 1969

3,454,191
CLOSURE MEANS FOR COVER MEMBER OF PRESSURE VESSEL
Jacques H. Mercier, 1199 Park Ave.,
New York, N.Y. 10028
Filed Jan. 26, 1967, Ser. No. 611,862
Claims priority, application France, Feb. 2, 1966,
48,091
Int. Cl. B65d 45/00
U.S. Cl. 220—55    12 Claims

ABSTRACT OF THE DISCLOSURE

The invention relates to the closure means for retaining the cover member of a pressure vessel in position and more particularly to means for retaining a cylindrical cover member in the end of a corresponding cylindrical container so that expulsion of such cover member is precluded.

BACKGROUND OF THE INVENTION

Field of the invention

This invention relates to the art of pressure vessels, more particularly of the type having a cylindrical mouth in which a cylindrical cover member is positioned and more particularly to the means for retaining said cover member in said container.

Description of prior art

As conducive to an understanding of the present invention, it is noted that where a pressure vessel is of the type having a cylindrical mouth in which a cover member is positioned and such cover member also mounts the mouth of a deformable bladder to form a seal, where the cover member is retained in position by bending over the rim of the mouth of the container, the deformation of the container due to such operation often breaks the seal with the result that the pressure vessel is not operative.

Accordingly, it is among the objects of the invention to provide a pressure vessel of the above type in which the cover member may be dependably retained in position without need for such deformation of the container that would break the seal between the cover member and the container effected by a resilient member interposed therebetween and without need for close tolerances in the fabrication thereof.

Another object is to provide retaining means for a cover member which will dependably retain the cover member in place, yet in the event of excessive pressure in the container, permits automatic release of such pressure to prevent bursting of the container or rapid expulsion of the cover member.

SUMMARY OF THE INVENTION

In accordance with the invention, the cover member is retained in position in the cylindrical mouth of the container by means of a plurality of retaining members against which the cover member abuts. The retaining members are conformed to permit movement of the cover member in the event of excessive pressure in the container to release the pressure therein to prevent bursting of the container and rapid expulsion of such cover member.

BRIEF DESCRIPTION OF THE DRAWINGS

In the accompanying drawings in which are shown one or more of various features of the several embodiments of the invention;

FIG. 1 is a longitudinal sectional view of a pressure vessel according to the invention taken along line I—I of FIG. 2;

FIG. 2 is a transverse sectional view taken along line II—II of FIG. 1;

DESCRIPTION OF THE PREFERRED EMBODIMENTS

Figure 3:
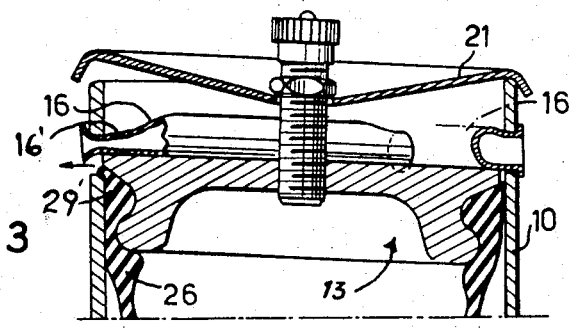
FIG. 3 is a view similar to FIG. 1 of the upper portion of the pressure vessel illustrating the functioning of the retaining means.

Referring now to the drawings, the embodiments shown in FIGS. 1 to 3, the pressure vessel illustratively is a pressure accumulator comprising a container 10 of strong rigid material such as steel or aluminum capable of withstanding the pressure to which the unit is subjected.

The container is cylindrical along the major portion of the body thereof and has a hemispherical end 12 which is perforated as at 23 to permit flow of oil therethrough. Secured as by welding as at 25 to the outer surface of the end 12 is an internally threaded nipple 24 axially aligned with the container 10 and with the perforations 23 to define an oil port 24'.

Positioned in the circular mouth of the container 10 and spaced inwardly from the end 11 thereof is a substantially cup-shaped cover member 13 which has an axial internally threaded opening 19 designed to receive a screw 18, the latter having a longitudinal bore 22 therethrough to permit introduction of gas under pressure therethrough.

The outer periphery 13' of cover member 13 adjacent its substantially flat top surface 13a is of diameter substantially the same as the inner diameter of the container so that it will fit snugly therein to center the cover member in the container. The side wall 13b of the cover member inwardly of the periphery 13' thereof is of outer diameter less than the inner diameter of the container to define a space therebetween to receive the mouth 29 of a deformable partition 26.

The partition 26 illustratively is a collapsible and expansible bladder, the mouth 29 of which is enlarged and which is desirably of resilient material such as rubber or synthetic plastic of like physical characteristics. The bladder defines two chambers in the pressure vessel, i.e., an oil chamber 28 which is in communication with the perforations 23 and the port 24' and a gas chamber 27 which is in communication with the bore 22.

The mouth 29 of the bladder 26 has an annular bead 29' formed integral therewith which is positioned in an annular groove 29a in the side wall 13b of the cover member 13. The bead 29' is of transverse thickness such that when the bladder 26 is mounted on the cover member 13 with the bead positioned in groove 29a and the assembly is moved into the container 10, a dependable seal will be provided. Preferably, the inner end 30 of side wall 13b is rounded to prevent cutting of the bladder when the latter is contracted in use.

According to the invention, in order to securely retain the cover member in the container, retaining means 14 are provided. More particularly, as shown in FIGS. 1 to 3, the retaining means comprises a pair of hollow members, such as tubes 16 which extend in parallel relation transversely across the container as shown in FIG. 2 on each side respectively of the longitudinal axis thereof. Associated with the tubes 16 are two pairs of aligned openings 17 which extend through the wall of the container adjacent the end 11 thereof, the ends of each of the tubes 16 extending through an associated pair of openings 17 as shown in FIGS. 1 and 2 and being secured in said openings as by flanged end caps 31, 32 which are forced into the bore of the tubes. Preferably, one end of each of the tubes 16 may be formed with a flanged end integral therewith so that the tubes may be readily inserted through one of the holes 17 into the aligned hole 17 and then a flanged end cap may be forced into the other end of the tube to secure the tubes in fixed position.

Associated with the end 11 of the container 10 is a cap 21 of suitable relatively rigid though resilient material such as sheet metal or a relatively strong plastic. As is shown in FIG. 1, the periphery 21' of the cap 21 is downwardly bent so that the cap may seat on end 11 with the axial opening 21a in the cap aligned with the opening 19 in the cover member, said cap being substantially conical as shown. The screw 18 also extends through said opening 21a and has a lock nut 20 which, when tightened, will move the cover member 13 upwardly against the tubular retaining members 16 as shown in FIG. 1. The screw 18 also carries a nut 15 to control the gas valve (not shown) positioned in bore 22.

The cap 21 and associated screw 18 thus limit inward movement of the cover member into the container. By adjustment of nut 20 the tension of cap 21 may be controlled.

To assemble the pressure vessel shown in FIGS. 1 to 3, the cover 13 with the bladder mounted thereon is first pushed into container 10 so that the top surface 13a of the cover member is inwardly of the openings 17. Thereupon, the retaining members 16 are mounted as previously described. The cap 21 is then positioned on the end 11 of the container 10 and the screw 18 is then passed through opening 21a in the cap 21 and screwed into opening 19. The nut 20 is then tightened to regulate the tension of the cap 21.

In operation of the device, the gas chamber 27 defined by the bladder 26 is charged with gas under pressure through bore 22 so as to inflate the bladder 26.

The oil chamber 28 is then charged through port 24' and perforations 23 with oil under pressure greater than that of the gas in chamber 27 and a valve (not shown) controlling port 24' is closed.

To use the charged device, the valve controlling port 24' is opened and the bladder 26 will expand to force fluid from chamber 28 through the perforations 23 and port 24'.

Due to the fact that the pressure in the container 10 will force the cover member 13 outwardly, the cover member will press tightly against the retaining members 16 to prevent removal thereof. Hence, the cover member 13 can only be removed when the pressure in the container 10 is extremely low..

In the event that the pressure in the container 10 should build up beyond a predetermined amount, the members 16 provide a safety feature to prevent rupture of the container. Thus, the tubular retaining members 16 are designed to flatten out when the pressure exceeds a predetermined amount.

In such case the transverse retaining members 16 will remain in position to prevent the cover member from being expelled, but as shown in FIG. 3, the extremities of the tubular member 16 will flatten out as at 16'. As a result, as shown in FIG. 3, the cover member 13 will tilt slightly, breaking the seal provided by the bead 29' between the interior and the exterior of the container so that a leak will occur to cause reduction of pressure in the container, thereby preventing rupture of the container and risk of the cover being expelled.

Figure 4:
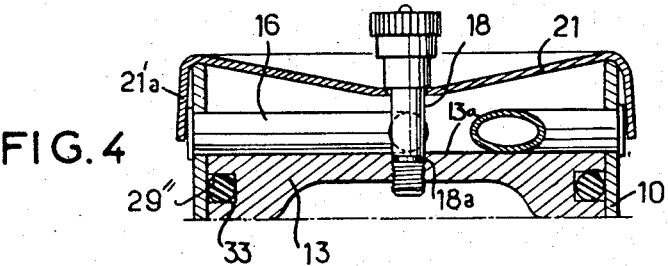
FIG. 4 is a fragmentary longitudinal sectional view of another embodiment of the invention.

The embodiment of FIG. 4 is similar to the embodiments shown in FIGS. 1 to 3 and corresponding parts have the same reference numerals. In this embodiment no bladder is utilized and the cover member 13 has an annular groove 33 in which an O ring 29" is positioned to provide a seal. The operation of the closure members 16 shown in FIG. 4 is identical to that shown in FIGS. 1 to 3.

In addition, the skirt 21a' shown in FIG. 4 depends so that it extends partially over the ends of the retaining members 16. Thus, the retaining members 16 cannot be removed until the cap 21 is removed. Since this necessitates the prior removal of screw 18, the pressure in the container would first be reduced before the members 16 could be removed. It is to be noted that the screw 18 in FIG. 4 has an annular groove 18a in which an O ring is positioned to provide a seal. Thus, when the screw 18 is turned so that the O ring is above the level of the top surface 13a of cover member 13, leakage will occur past the threads in the screw to reduce pressure to prevent the screw from being blown out as it is being removed.

Figure 5:
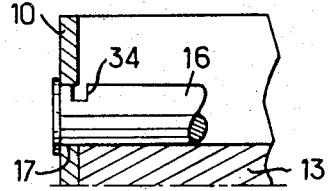
FIG. 5 is a detailed sectional view illustrating a modification of the retaining means.

If desired, the retaining member 16 could be solid as shown in FIG. 5 and the end of one of the retaining members could be provided with a notch 34, a portion of which extends into the opening 17. Thus, if the pressure in the container should exceed a predetermined amount, the end of the retaining member 16 having the notch would shear permitting tilting of the cover member for release of pressure while the other retaining member would securely hold the cover member in the container.

Figure 6:
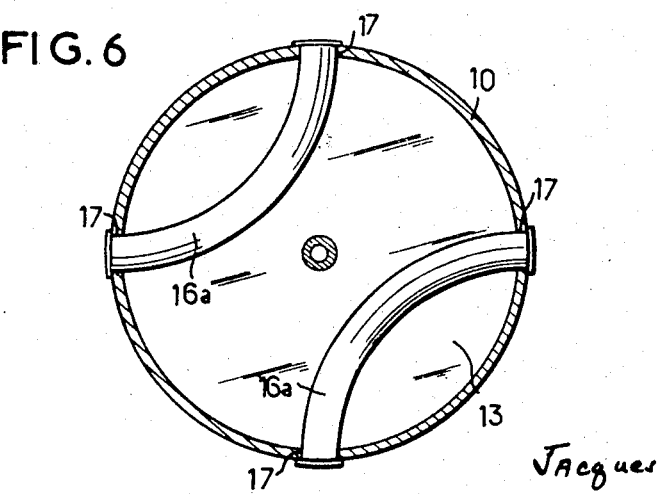
FIG. 6 is a view similar to FIG. 2, but showing the use of arcuate retaining means.

Although the retaining members have been shown as straight rods or tubes, in FIGS. 1 to 4, it is of course to be understood that they could be arcuate as shown in 16a in FIG. 6.

Figure 7:
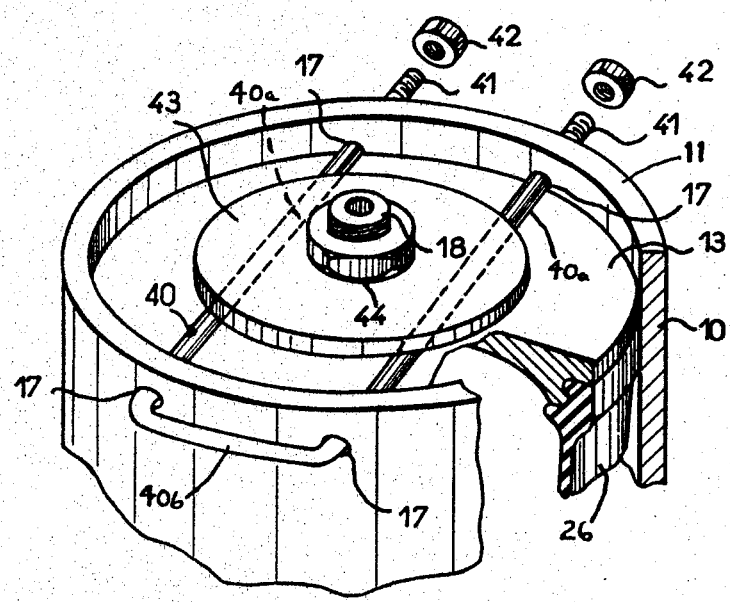
FIG. 7 is a fragmentary top perspective view of another embodiment of the invention.

The embodiment shown in FIG. 7 is also similar in many respects to the embodiments shown in FIGS. 1 to 3 and corresponding parts have the same reference numerals.

Referring to FIG. 7, the retaining member 40 is substantially U-shaped having a pair of spaced parallel legs 40a and a crosspiece 40b. The container 10 adjacent its upper end 11 has two pairs of aligned openings 17 through which the legs 40a of the retaining member 40 extend. The free ends of legs 40a are threaded as at 41 to receive nuts 42 to lock the retaining member in position.

Figure 8:
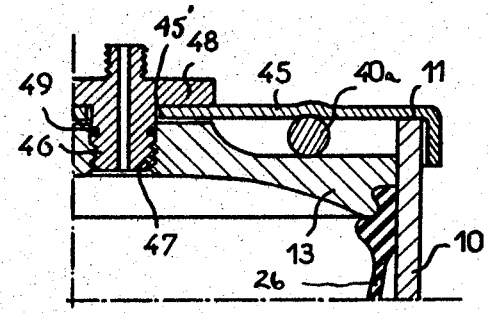
FIG. 8 is a partial longitudinal sectional view of still another embodiment of the invention.

The legs 40a extend across the upper surface of cover 13 and a disc 43 is positioned over said legs, being retained in position by a nut 44 threaded on screw 18 which also is threaded into the cover member 13. In the embodiment shown in FIG. 8 a plate 45 is provided which rests on the end 11 of container 10 and also presses against the legs 40a. The plate 45 has a central opening 45' through which extends a plug 46 which has a central bore threaded as at 47 to permit charging of the bladder 26. The plug 46 has annular flange 48 which rests on the top surface of disc 45 and also has an annular groove in which an O ring 49 is positioned. Thus, when the plug 46 is unscrewed the seal effected by ring 49 will be broken to release pressure.

Figure 9:
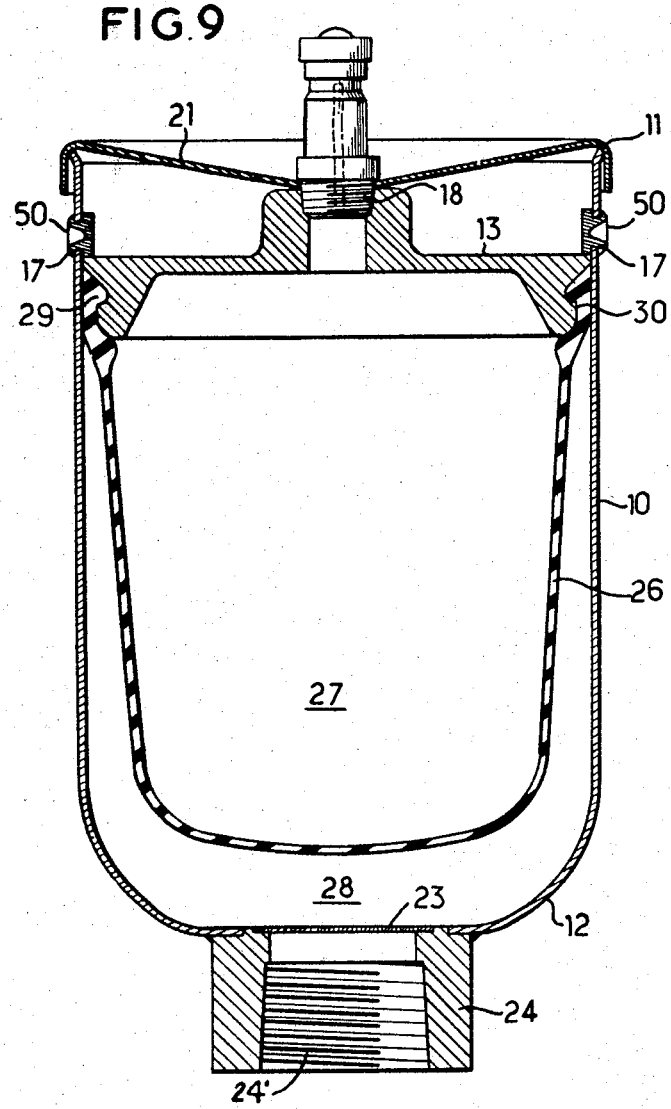
FIG. 9 is a view similar to FIG. 1 of still another embodiment of the invention.

The embodiment of the pressure vessel shown in FIG. 9 is also similar to the embodiment shown in FIGS. 1 to 3 and corresponding parts have the same reference numerals.

In this embodiment the cover member 13 is retained in position by means of a plurality of individual elements such as rivets 50 which are secured in a plurality of circumferentially spaced openings 17 in the container 10 adjacent its upper end 11. The rivets 50 extend inwardly into the container to serve as an abutment for the periphery of the cover member 13.

Figure 10:
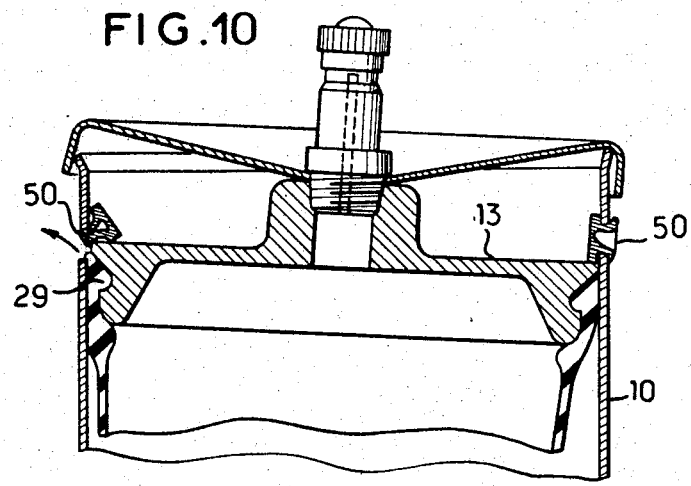
FIG. 10 is a fragmentary view similar to FIG. 9 showing the function of the retaining means of FIG. 9.

With the construction shown in FIG. 9, if while the container is under pressure an attempt was made to remove the rivets 50 which illustratively have blind holes, one by one, cover 13 would become inclined as shown in FIG. 10 before all the rivets were removed which would permit release of pressure from the container and prevent sudden expulsion of the cover member 13.

Due to the fact that the rivets 50 have blind holes, they will remain intact so long as the pressure in the container 10 does not exceed a predetermined amount. When such pressure is exceeded, the rivets will flatten out and although they will still serve to prevent the cover 13 from being expelled from the container, the cover will lift slightly to break the seal effected by the annular bead 19 so that the pressure in the container will be relieved.

Figure 11:
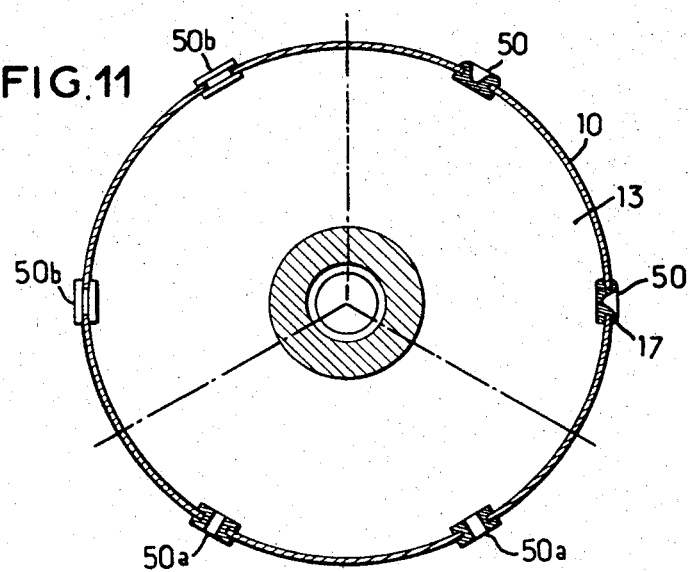
FIG. 11 is a view illustrating different types of rivets for the retention of the cover member of FIG. 10, and FIGS. 12 and 13 are fragmentary longitudinal sectional views of other embodiments of the invention.

Referring to FIG. 11, rivets of different type could be used to retain the cover 13 in position in the container 10. Thus, blind hole rivets 50 could be used as well as rivets 50a having holes therethrough and rivets 50b which are solid. At least one of the solid rivets 50b is designed so that it will offer less resistance than the other solid rivets so that in case of excessive pressure the cover will tilt to release the seal. More particularly, the rivet could be of less resistance material or have a notch as shown in FIG. 5 with respect to the embodiments of FIGS. 1 to 4, for example, to facilitate shearing to permit tilting of the cover.

Figure 12:
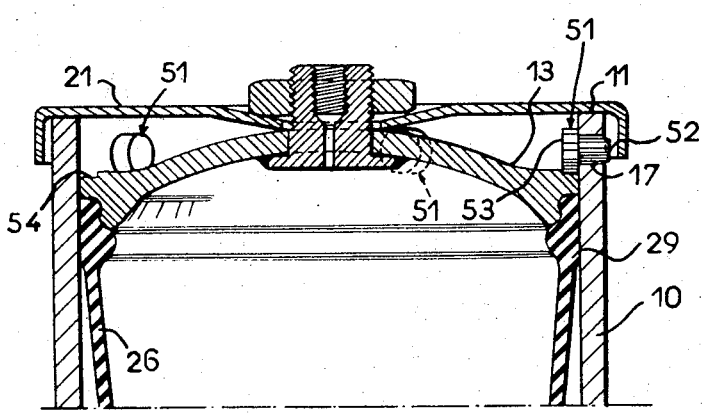

In the embodiment of FIG. 12 the cover member 13 is retained in position by a plurality of pins 51, each having a stem 52 adapted to be positioned in one of a plurality of circumferentially spaced openings 17 in the container 10 and an enlarged head 53 adapted to be applied against the inner surface of the wall of the container. The cover member 13 has a peripheral groove 54 in which the heads 53 of pins 51 may be positioned to prevent inward movement of such pins. If desired, bolts could be used in place of the pins.

As shown in FIG. 12 a cap 21 is provided which rests on the end 11 of container 10 and has a depending flange which extends over the ends of the stems to prevent removal. With the construction shown in FIG. 12 the cover member 13 cannot be removed while there is any substantial pressure in the container. Thus, to remove the cover member, the cap 21 must first be removed and then the pins 51 must be moved inwardly. This cannot be done until the heads of the pins are clear of the groove 54 which cannot be accomplished until the cover member is moved inwardly and this only when the pressure in the container has been reduced.

Figure 13:
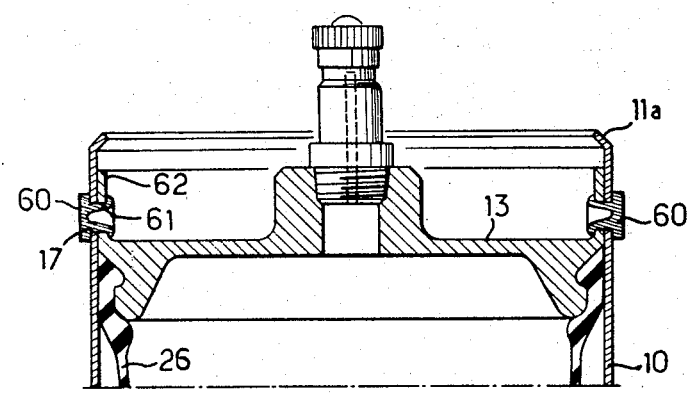

The embodiment shown in FIG. 13 is similar to that shown in FIG. 12 except that the cover member 13 has an upstanding annular flange 62 which has a plurality of circumferentially spaced openings 61 adapted to be aligned with the openings 17 in the container 10. Suitable rivets 60 extend through aligned openings 17 and 61 to retain the cover member in position.

With this arrangement no separate cap 21 is required. Desirably, the end of the container 10 is inwardly bent as at 11a to form a safety bearing to prevent sudden expulsion of the cover 13, the inwardly bent end 11a being capable of being straightened by a suitable tool for removal of the cover member.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel comprising a rigid hollow container having a mouth at one end and having a port at the other end, said container having a plurality of openings in the wall thereof adjacent its mouth, a cover member adapted to be positioned in the mouth of said container, said cover member having an axial bore, means to provide a seal between the periphery of said cover member and the adjacent wall of said container, abutment means to retain said cover member in said container, said abutment means comprising a pair of hollow rods positioned respectively on each side of the axis of the cover member and having their ends extending through an associated opening.

2. A pressure vessel comprising a rigid hollow container having a mouth at one end and having a port at the other end, said container having a plurality of openings in the wall thereof adjacent its mouth, a cover member adapated to be positioned in the mouth of said container, said cover member having an axial bore, means to provide a seal between the periphery of said cover member and the adjacent wall of said container, abutment means to retain said cover member in said container, said abutment means comprising a pair of parallel rods positioned respectively on each side of the axis of the cover member and having their ends extending through an associated opening.

3. A pressure vessel comprising a rigid hollow container having a mouth at one end and having a port at the other end, said container having a plurality of openings in the wall thereof adjacent its mouth, a cover member adapted to be positioned in the mouth of said container, said cover member having an axial bore, means to provide a seal between the periphery of said cover member and the adjacent wall of said container, abutment means to retain said cover member in said container, said abutment means comprising a pair of arcuate rods positioned respectively on each side of the axis of the cover member and having their ends extending through an associated opening.

4. A pressure vessel comprising a rigid hollow container having a mouth at one end and having a port at the other end, said container having a plurality of openings in the wall thereof adjacent its mouth, a cover member adapted to be positioned in the mouth of said container, said cover member having an axial bore, means to provide a seal between the periphery of said cover member and the adjacent wall of said container, abutment means to retain said cover member in said container, said abutment means comprising a pair of rods positioned respectively on each side of the axis of the cover member and having their ends extending through an associated opening, said pair of rods forming the legs of a U-shaped member having a crosspiece joining one of the ends of each of said rods, said crosspiece being positioned on the outer side of said container between two of said openings, the other ends of said rods being threaded and a nut secured to each of said threaded ends.

5. The combination set forth in claim 4 in which a disc is positioned over said rods and is axially aligned with the opening in said cover member, said disc being of smaller diameter than said cover member, and means to clamp said cover member and disc together with said rods intervening.

6. The combination set forth in claim 4 in which a cap is positioned over said cover member, said cap extending over said rods with its periphery resting on the end of said container and means to clamp said cap against said rods to retain the latter against the cover member.

7. The combination set forth in claim 6 in which said cap has an axial opening aligned with the opening in said cover member, a plug is provided having an annular flange, said plug being threaded to engage complementary threads in the opening in said cover member and a gasket encompassing said plug adjacent the outer end of the opening in said cover member.

8. A pressure vessel comprising a rigid hollow container having a mouth at one end and having a port at the other end, said container having a plurality of circumferentially spaced openings in the wall thereof adjacent its mouth, a cover member adapted to be positioned in the mouth of said container, said cover member having an axial bore, means to provide a seal between the periphery of said cover member and the adjacent wall of said container, abutment means to retain said cover member in said container, said abutment means comprising a plurality of rivets secured in each of said openings and extending inwardly into said container in the path of movement of said cover member, each of said rivets having a blind opening to permit deformation of said rivets.

9. A pressure vessel comprising a rigid hollow container having a mouth at one end and having a port at the other end, said container having a plurality of circumferentially spaced openings in the wall thereof adjacent its mouth, a cover member adapted to be positioned in the mouth of said container, said cover member having an axial bore, means to provide a seal between the periphery of said cover member and the adjacent wall of said container, abutment means to retain said cover member in said container, said abutment means comprising a plurality of rivets secured in each of said openings and extending inwardly into said container in the path of movement of said cover member, each of said rivets being solid and at least one of said rivets being conformed to offer less resistance than the other rivets to permit tilting of said cover member when the pressure in said container exceeds a predetermined amount.

10. The combination set forth in claim 9 in which said last named rivet is solid and has a notch therein, a portion of which extends partially into the associated opening.

11. A pressure vessel comprising a rigid hollow container having a mouth at one end and having a port at the other end, said container having a plurality of circumferentially spaced openings in the wall thereof adjacent its mouth, a cover member adapted to be positioned in the mouth of said container, said cover member having an axial bore, means to provide a seal between the periphery of said cover member and the adjacent wall of said container, abutment means to retain said cover member in said container, said abutment means comprising a pin having a stem and an enlarged head, said stem being positioned in the associated opening and said head being positioned in the interior of said container, said cover member having a peripheral annular groove in the top surface thereof in which the heads of said pins are adapted to be seated to prevent inward movement of said pins.

12. The combination set forth in claim 11 in which a cap is positioned over said cover member with the periphery of said cap resting on the mouth of said container, said cap having a depending annular flange extending over the outer ends of the stems of said pins, and means to clamp said cover member and said cap together.

References Cited

UNITED STATES PATENTS 2,352,382  6/1944  Hendricks.
3,072,286  1/1963  Cusumano.

FOREIGN PATENTS 1,175,043  8/1964  Germany.

JAMES B. MARBERT, *Primary Examiner.*